United States Patent
Pasternak

(10) Patent No.: US 12,335,658 B2
(45) Date of Patent: Jun. 17, 2025

(54) REMOTE BROWSING ISOLATION FOR RESOURCE SHARING VIDEO CONFERENCING

(71) Applicant: Ericom Software Ltd., Jerusalem (IL)

(72) Inventor: Erez Pasternak, Modiin (IL)

(73) Assignee: Ericom Software Ltd., Jerusalem (IL)

( * ) Notice: Subject to any disclaimer, the term of this patent is extended or adjusted under 35 U.S.C. 154(b) by 464 days.

(21) Appl. No.: 17/720,381

(22) Filed: Apr. 14, 2022

(65) Prior Publication Data
US 2022/0345663 A1 Oct. 27, 2022

Related U.S. Application Data

(60) Provisional application No. 63/177,488, filed on Apr. 21, 2021.

(51) Int. Cl.
*H04N 7/14* (2006.01)
*H04L 67/025* (2022.01)
*H04L 67/56* (2022.01)
*H04N 7/15* (2006.01)

(52) U.S. Cl.
CPC .......... *H04N 7/147* (2013.01); *H04L 67/025* (2013.01); *H04L 67/56* (2022.05); *H04N 7/152* (2013.01)

(58) Field of Classification Search
None
See application file for complete search history.

(56) References Cited

U.S. PATENT DOCUMENTS

| 8,370,431 B1* | 2/2013 | Wang | H04L 63/10 709/204 |
|---|---|---|---|
| 10,558,824 B1* | 2/2020 | Remington | H04L 67/02 |
| 11,290,429 B1* | 3/2022 | Ashley | G06F 21/6245 |
| 11,489,845 B1* | 11/2022 | Feng | H04L 63/1408 |
| 2016/0205185 A1* | 7/2016 | Gampel | H04L 61/5007 709/218 |
| 2022/0100902 A1* | 3/2022 | Juniper | H04L 63/0281 |
| 2022/0188438 A1* | 6/2022 | Lewin | H04L 63/0281 |
| 2022/0300637 A1* | 9/2022 | Claeys | G06F 21/6209 |

OTHER PUBLICATIONS

Jang-Jaccard, J., Nepal, S., Celler, B. et al. WebRTC-based video conferencing service for telehealth. Computing 98, 169-193 (2016). https://doi.org/10.1007/s00607-014-0429-2. (Year: 2016).*

* cited by examiner

*Primary Examiner* — Bassam A Noaman
(74) *Attorney, Agent, or Firm* — Rivka Friedman

(57) ABSTRACT

A method for remote browsing, including: running a local browser instance; running a remote browser to interface between a third party and the local browser; sending an image of the remote browser to the local browser and presenting an image of the local browser to the third party; selecting, on the remote browser, a local resource from a virtual representation of the local resource on the remote browser; and redirecting data from the selected local resource from the local browser to the remote browser.

13 Claims, 4 Drawing Sheets

REMOTE BROWSING ISOLATION FOR RESOURCE SHARING VIDEO CONFERENCING

This patent application claims the benefit of U.S. Provisional Patent Application No. 63/177,488, filed Apr. 21, 2021, which is incorporated in its entirety as if fully set forth herein.

FIELD OF THE INVENTION

The present invention relates to Internet communications and, more particularly, to a method and system ensure that no 3rd party or unauthorized applications operate on a local machine during a web conference session.

BACKGROUND OF THE INVENTION

Remote Browser Isolation (RBI) is an advanced cybersecurity technique that provides an additional layer of protection for users and organizations. Browser isolation separates browsing activity from endpoint hardware, thereby reducing the end user device's attack surface. When a user accesses a web page or app, it is loaded onto a remote browser that serves a rendering of the webpage to the user. The page operates normally, but only pixels are delivered to the user. There is no active content downloaded, so malicious code that may be hidden in the webpage is kept at bay.

A web conference is an online meeting in which participants of the meeting can share a real-time view of their computer screen with other meeting participants. Web conferences are often used to facilitate the demonstration of new software, to give a web seminar, or to facilitate a variety of other types of presentations over the Internet, such as collaboration or white boarding. A web conference is often used in conjunction with Audio and Video Conferencing. In operation, the meeting moderator connects, most often using a browser, to a web conferencing service. The service allows participants the ability to share with other meeting participants the real-time view of a particular application or an entire desktop screen. Similarly, each meeting participant accesses the service to view the shared content via a web browser on his/her machine.

Web meetings are a growing industry, as companies seek to reduce travel costs with collaborations partners. These meetings often can have very dynamic sets of participants. In web conferencing the use of unknown or insecure 3rd party applications often occurs and due to the sometimes-intricate nature of the meeting proceedings it is necessary to conduct the web conference session but to preclude the execution of insecure software on a local operating machine.

This problem (of insecure or unapproved 3rd party application software executing on a machine) is exacerbated in larger meetings and in common corporate meetings, wherein invitees are using their locally controlled, often personal machine to conduct the web conference and often have administrative control that allows them to use any variety of unapproved or insecure applications that might introduce risk into the connected machines that are present in the web meeting session.

Another use case is when people from different organizations are joining the meeting, so even if the first organization has full control of the Web conference application/service—(e.g., an in-house app), the other participants are less secure.

In addition, using Web Conferencing software, participants are often able to share files with other participants. These files may be infected (e.g., malware, ransomware, etc.) or expose sensitive information like credit card numbers, and there is no easy way for the enterprises to control what can be shared and how.

To make the problem even harder to solve, there are many web conference applications, and in many situations, people use 3 or 4 different applications depending on what the other people are using, so a generic solution is needed.

Also, when companies allow the users to use web conferencing, they still want to be able to have control, like being able to define which user can access which web conferencing "site", have audit log to track usage, and being able to restrict actions such as using the clipboard function, file upload or download, set DLP rules and scan downloaded files.

SUMMARY OF THE INVENTION

The instant disclose provides improved techniques for eliminating the risk that 3rd party software introduces into web meetings.

The disclosed technique uses remote browser isolation to secure a web conferencing session and eliminate the risk that 3rd party unapproved software might be introduced to a local user machine.

The instant system allows the admin to allow the web conference, and be able to allow/block resource sharing, like allowing screen sharing but blocking webcam sharing.

According to the present invention there is provided a method for remote browsing, including running a local browser instance; running a remote browser to interface between a third party and the local browser; sending an image of the remote browser to the local browser and presenting an image of the local browser to the third party; selecting, on the remote browser, a local resource from a virtual representation of the local resource on the remote browser; and redirecting data from the selected local resource from the local browser to the remote browser.

According to further features in preferred embodiments of the invention described below the data is redirected from the local browser to the remote browser via direct peer-to-peer communication from within a browser.

According to still further features in the described preferred embodiments the direct peer-to-peer communication is facilitated by Web Real-Time Communication (WebRTC).

According to still further features the method further includes generating a menu of local resources, on the remote browser, from which the virtual representation of the local resource is selected.

According to still further features the method further includes scanning an end-user device running the local browser to ascertain available local resources to populate the menu of local resources; wherein the scanning is performed continuously or on demand.

According to still further features the remote browser is configured to have a short life span.

According to still further features the local resource is selected from the group including: a microphone, a webcam, a screen.

According to still further features the step of sending the image of the remote browser to the local browser is performed using WebRTC.

According to still further features the third party is a web conferencing (WC) service.

According to still further features the third party is a Remote Support service.

According to still further features the local browser connects to the remote browser via a proxy.

According to still further features the local browser downloads an agent (e.g., a web application) from the proxy to enable communication with the remote browser.

According to still further features the data from the local resources is also redirected to the proxy.

According to still further features the data is manipulated by the agent and remote browser.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of methods and systems which utilize remote browser isolation to secure a web conferencing session and eliminate the risk of a 3rd party introducing unapproved software on a local user machine according to the present invention may be better understood with reference to the drawings and the accompanying description. The methods and systems also utilize remote browser isolation to enable resource sharing in a safe manner.

Some embodiments of the present invention are described herein, by way of example only, with reference to the accompanying drawings. With specific reference to the drawings in detail, it is stressed that the particulars shown are by way of example and merely for the purposes of illustrative discussion of example embodiments of the invention. In this regard, the description taken with the drawings makes apparent to those skilled in the art how embodiments of the invention may be practiced.

Figure 1A:
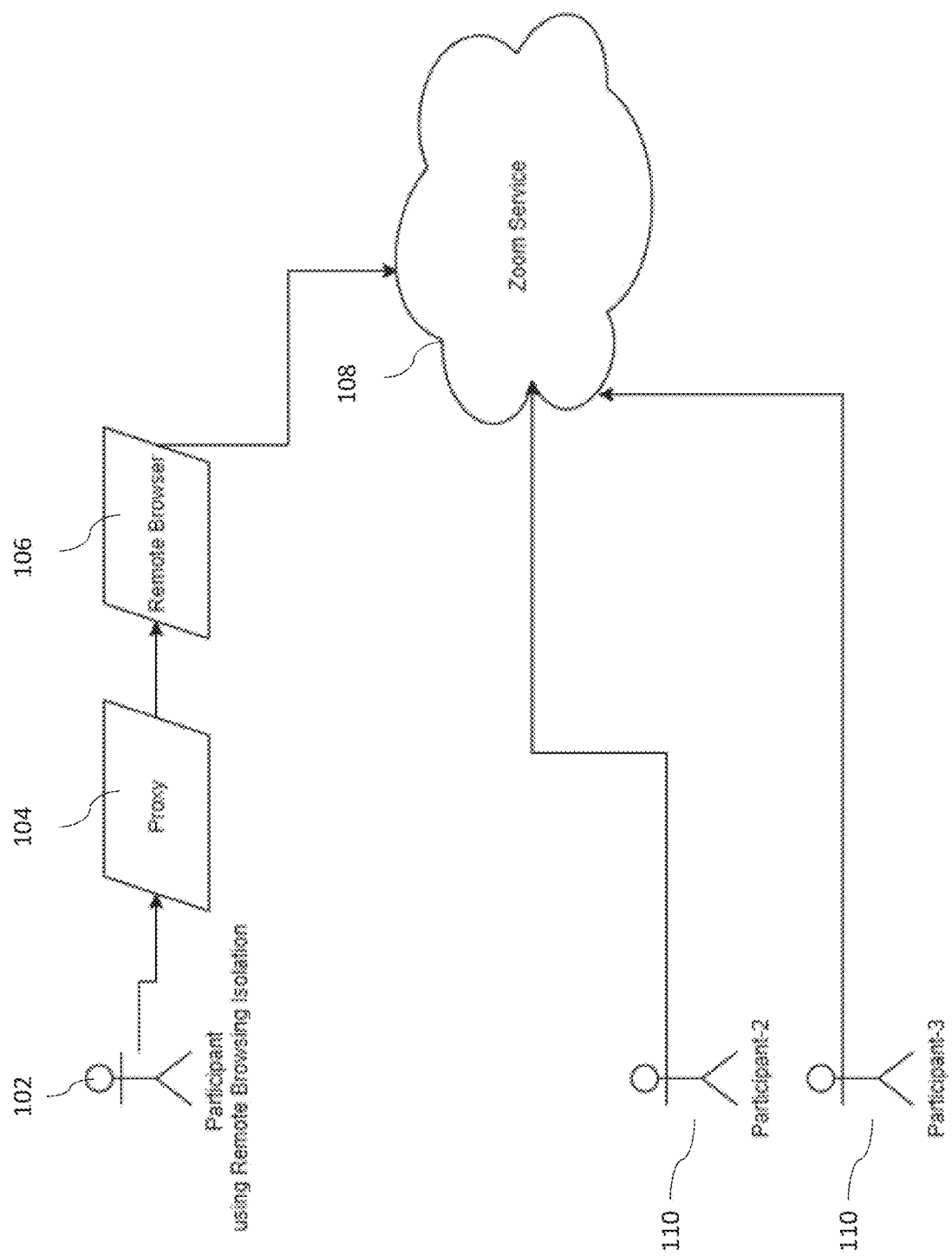
FIG. 1A is a diagram illustrating an example system environment and architecture of embodiments according to one aspect of the present invention.

Referring now to the drawings, FIG. 1A is a diagram illustrating an example system environment and architecture of embodiments according to one aspect of the present invention. The example embodiment includes a first participant 102 using the Remote Browsing Isolation solution of the present invention connected to a web service (in this example a web conference service exemplarily illustrated as a Zoom™ Service) 110 via a proxy 104 and a remote browser 106. Further, an additional one or more users/participants (each operating a client computing device) 110 are connected to the WC service.

Figure 1B:
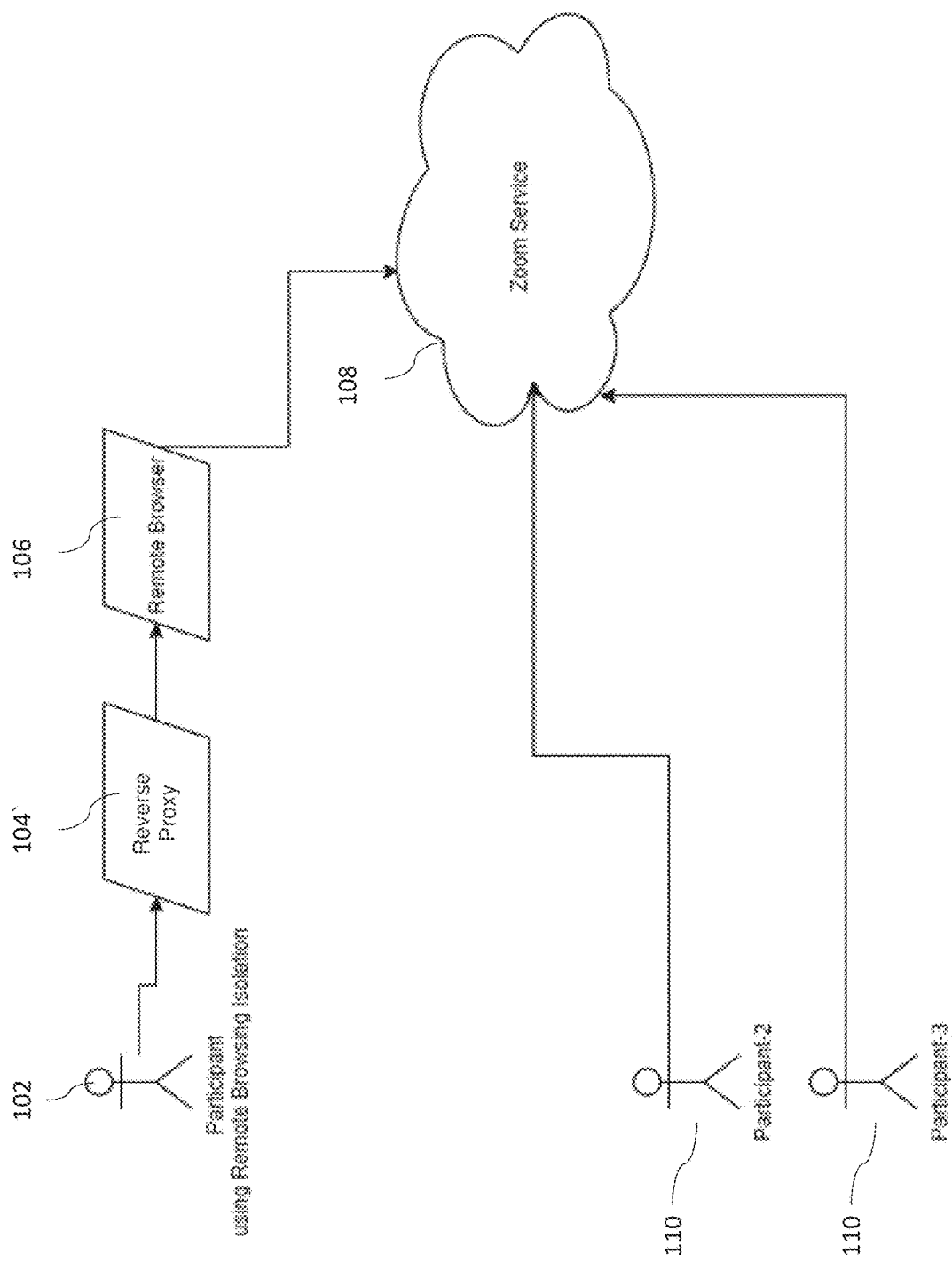
FIG. 1B is a diagram illustrating an example system environment and architecture of another embodiment according to one aspect of the present invention.

In another embodiment, as shown in FIG. 1B, at least one end user 102, operating a user client computing device, i.e., a client computer/machine (e.g., laptop, desktop, mobile device, etc.) interacts with a web service (e.g., web video conferencing service such as Zoom™) 110 via a reverse proxy 104' and a remote browser 106. Further, an additional one or more users/participants (each operating a client computing device) 110 are connected to the WC service.

In the following description, an example embodiment is described within the non-limiting context of a web-based video conference meeting/session. This context is for example purposes only, and intended merely to more clearly demonstrate the structure and function of the components of the present system. All descriptions herein relating to a proxy are to be understood herein as relating to a reverse proxy in a similar manner mutatis mutandis.

Bearing the above in mind, by using the proxy (or reverse proxy) and the remote browser, the End User 102 is able to participate in a video conferencing meeting using a local browser (e.g., Mozilla Firefox, Google Chrome, Safari, Microsoft Internet Explorer, etc.) installed and operating on the client device, and benefit from all the features provided by the video conferencing platform, including audio/video conferencing, desktop sharing, chatting with other participants, transferring files, etc.

The isolation technique provided by the proxy 104 and remote browser 106 allows sharing local resources, such as, for example, audio resources (e.g., microphone), display resources, video resources (e.g., webcam), and the like, from the end user 102 to a Remote Browser 106.

Figure 2:
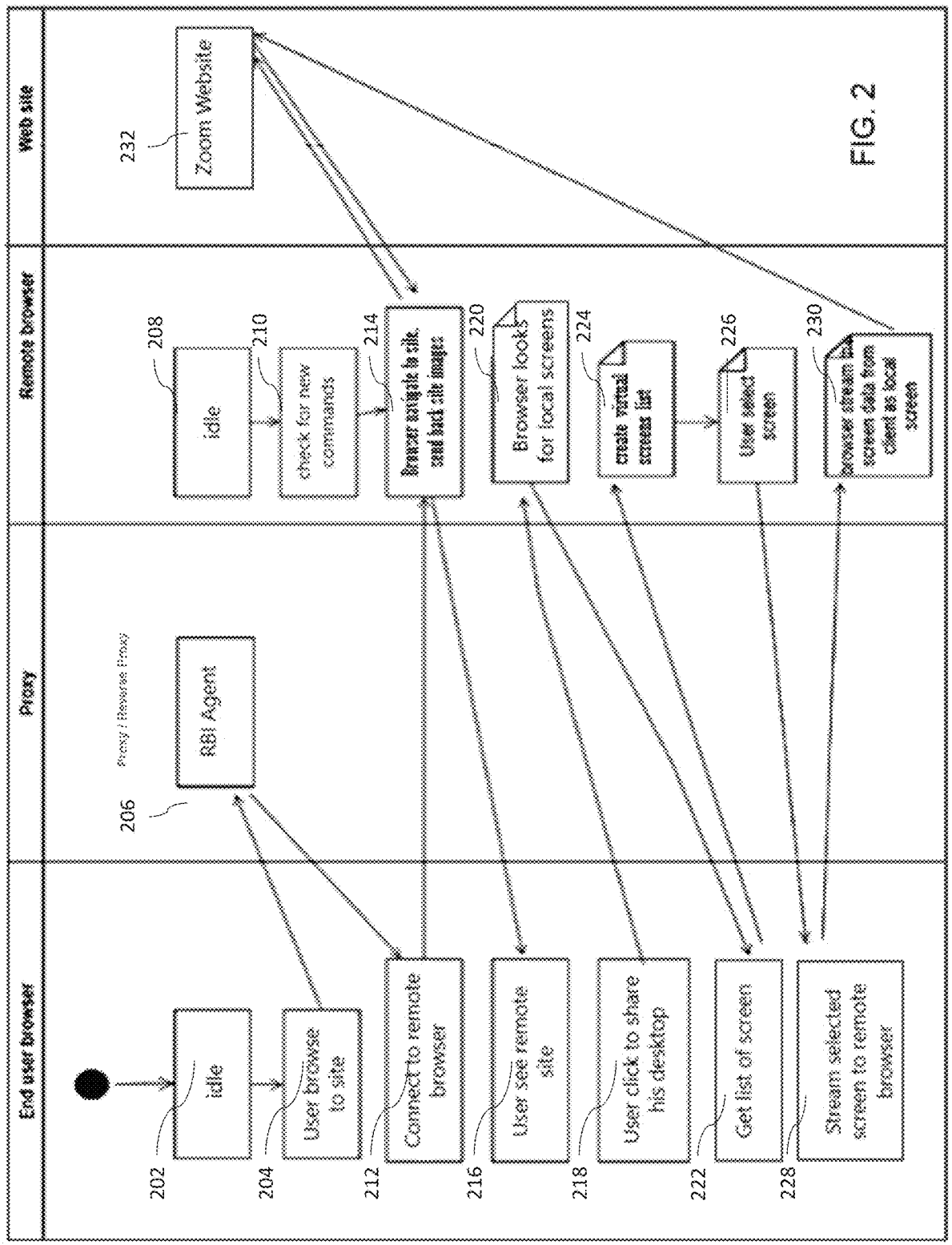
FIG. 2 is a flow diagram of a Web Conferencing session using Remote Browsing Isolation.

FIG. 2 depicts a flow diagram of a Web Conferencing session using Remote Browsing Isolation.

At step 202 the end user browser is idle. At step 204 the client computer Local Browser is connected, via a communication network (e.g., the Internet, an Intranet, cellular network, and the like) to a network element, which in preferred but non-limiting embodiments is implemented as a Proxy. In other embodiments, the network element is implemented as a reverse proxy. At step 206, the local browser receives, via the proxy (or verse proxy), a custom page with an agent (RBI Agent) which, at step 212, connects to the Remote Browser. Prior to the local browser connecting to the Remote Browser, at step 208, the remote browser is idle. This remote browser is preferably a temporary instance on a very secure device or in a cloud or in a cloudless computing environment. According to some embodiments, a new instance of the remote browser is used for every new website. For improved security, the remote browser instance should have a short life, terminating shortly after the local browser disconnects from the remote browser. According to some embodiments, a new instance of the remote browser is used for every new website. At step 210, the Remote Browser checks for new commands. This happens periodically until commands are received or the instance is terminated for other reasons. The RBI agent is executed on the local browser, which connects the local browser to the remote browser (at step 212). The Remote Browser navigates, at step 214, to originally requested site (e.g., Zoom™ site) 216 and sends back screen images to the RBI agent that is running on the local browser.

The Remote Browser sends visual images to the end user, such that every user action performed on the client computer, such as web page scroll, is sent to the remote browser and updated images are sent to the client computer, at step 216. In some embodiments (see FIG. 3, 306), the data is streamed from the Remote Browser back to the Local Browser using WebRTC (as opposed to sending images [e.g., jpegs] to the Local Browser). Either way, this method provides zero risk to the end user, as the end user machine does not receive any external resources.

Ordinarily, when the End-User attempts to open a Web Conferencing (WC) Session in the local browser using a known WC platform (e.g., Zoom™, MS Teams™, Google Meet™, etc.) and join/create a Web Meeting, the browser will request access to local resources on the end-user machine. When using the instant innovative system and method, the Remote Browser intercepts the request to obtain/get/access the local resources (Microphone, Camera, etc.). The request is sent to the Local Browser which performs it and sends the response to the remote browser. The Remote Browser emulates these device capabilities as virtual resources running on the Remote Browser.

An example is depicted in FIG. 2 that will illuminate the explanation above. In the example, at step 218, the user clicks on the web conferencing tool that allows the end user to share his screen (e.g., the 'share screen' tool in Zoom™. What the user is actually doing is moving the cursor or touching the button on the screen which is merely an image of the session that is being held on the Remote Browser. Like a shadow puppet, the share desktop/screen tool is actuated on the WC session running on the Remote Browser. The WC session looks for local screens at step 220. Seeing as the Remote Browser does not have any of the local screens, at step 222 the Remote Browser sends a request to the client computer to get the list of local screens (or any other resource) from the end user browser/device. At step 224 the Remote Browser generates a virtual list (e.g., based on meta data received from the local browser regarding the available screens) of screens which would look the same as if the WC session were running on the local browser or device. In some embodiments, the system even emulates the local screens on the remote browser to allow the user to select which screen they wish to render or interact with.

At step 226, the user selects a screen on the Remote Browser. At step 228 the Remote Browser retrieves or receives a stream of the local screen from the local browser. For example, the remote client captures that screen (e.g., captures an image of the screen) and sends the capture in a stream to the remote instance via the browser. At step 230 the Remote Browser streams the screen data from end user device as if it was a local screen. For example, the remote browsing session creates a virtual screen that provides the data received from the client as a local screen. The WC session is unaware of the fact that the screen data is being streamed from the Remote Browser. At step 232, the WC session on the remote browser sends the screen to the Zoom™ website for sharing with the other participants.

The Local Browser can share its local resources (microphone, etc.) using, for example, WebRTC, to the Remote Browser, which redirects the relevant streams to the Web Conferencing Web Site/Local Browser.

WebRTC (Web Real-Time Communication) is a Web specification that can be used to add real time media communications directly between browser and devices via application programming interfaces (APIs). WebRTC enables voice and video communication to work inside web pages. This can be done without any prerequisite plugins being installed in the browser. The instant system and method must also 'mislead' the WC service into believing that the information that the WC service is receiving on the Remote Browser is actually coming from the Local Browser. The Remote Browser emulates the screens and resources of the Local Browser/end user device such that when the service displays (sends to the WC website for distribution to the other members on the conference session) an image of one of the screens from the local/end user device, it 'believes' that it is displaying an image of the device on which it is running, which is not true.

The terms used in the foregoing paragraph anthropomorphize the WC service are used to convey a meaning as opposed to describing the technical manner in which the functions are performed. Suffice it to say that the Remote Browser running on a secure, remote device (proxy) provides the WC service with all the data and/or meta data that the local browser and/or local device would, thereby tricking the WC service to believe that it is running on a local browser of the local/end user device. For example, the instant system may create virtual or simulated resources and screens in such a way that the WC service interprets these screens and resources as being real.

It is important to note that by using the proxy/remote browser secure method, the End User can join any web conference with other participants connected to the web conference regardless of whether or not the other participants use this secure method.

This method provides a complete and transparent solution for Web Conferencing using Remote Browsing Isolation.

By using WebRTC, the solution enables the utilization of local resources which are generally hard to share with the Remote Browser and provides a good and low-latency user experience.

Essentially, this renders the remote content on the local browser and eliminates the need for locally operating software or applications on the end user client computer as they are functioning in the remote instance. No software or applications are executing on the local machine and the risk of unsecured or unapproved 3rd party software operating locally is eliminated.

For example, when an end user shares a screen, webRTC transfers (streams) the image of the shared screen to the Remote Browser. The WC service running on the Remote Browser (e.g., Zoom™, Google Meet™ etc.) sees the image of the shared screen as if it was a local screen. Some WC services use webRTC to relay this image to other participants, other do not. For example, Zoom™ does not use webRTC to relay this image to other participants whereas Google Meet™ does use webRTC to relay the data.

The foregoing has outlined some of the more pertinent features of the invention.

These features should be construed to be merely illustrative. Many other beneficial results can be attained by applying the disclosed invention in a different manner or by modifying the invention as described above.

Figure 3:
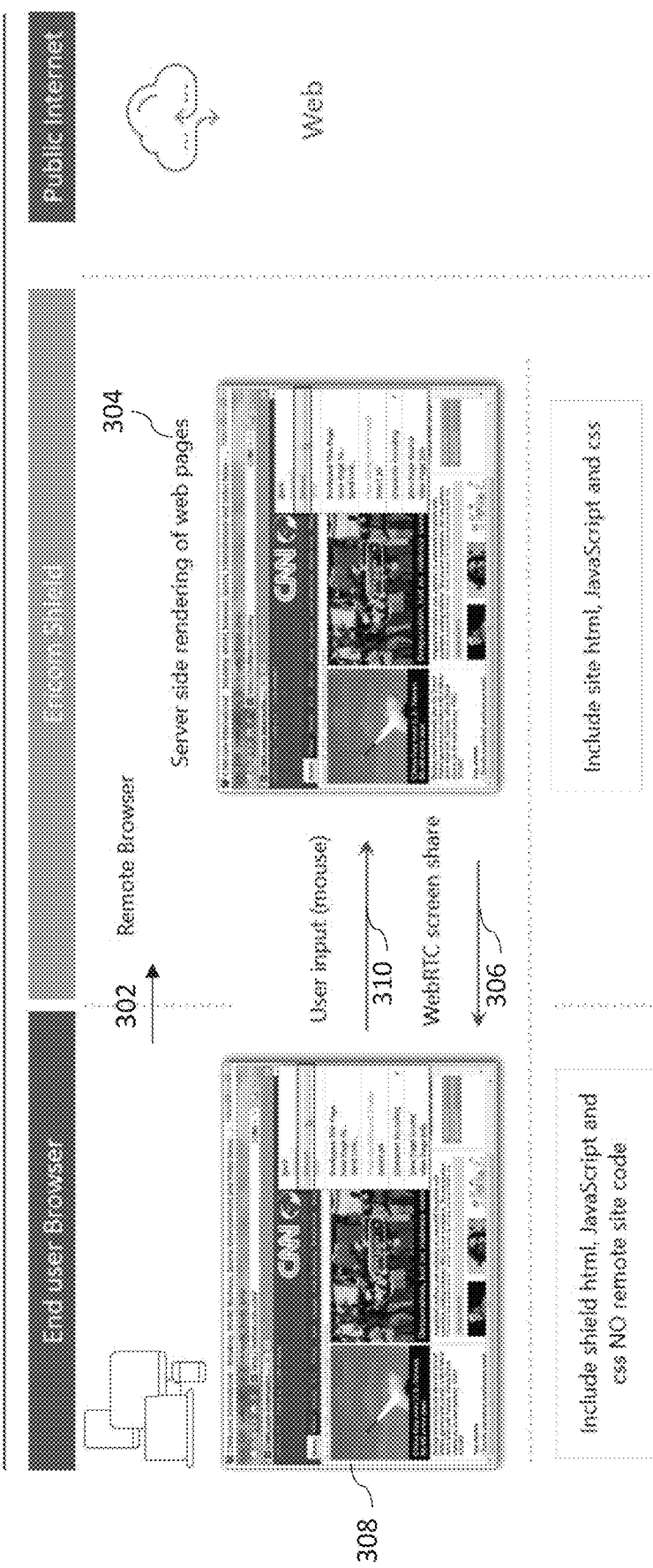
FIG. 3 is a flow diagram of an example implementation of the method of the instant system.

The subject matter described herein can be conceptually subdivided into various aspects of the present invention which are believed to each stand alone and have utility in their own right. Some of the various aspects may, in certain instances, be used to advantage in combination. The following is a brief summary of some examples of the various aspects of the present invention:

1. Video-Streaming Rendering Mode (FIG. 3)
    a. "Remote Browser rendering" sends visual images to the end user, every user action (e.g., scroll), is sent to the remote browser and updated images are sent to the client, thereby providing zero risk as the end user machine does not receive any external resources.
    b. In stream mode, in-house algorithms are executed to determine (in real-time) what image quality to use, what update rate (Frames Per Second—FPS) to allow and execute flow control logic to allow better user experience.
    c. In Video Streaming Rendering Mode (e.g., webRTC rendering), webRTC algorithms are used to determine whether to use TCP or UDP networking, select the proper codec for video (VP8, VP9, H264), audio (opus), change quality and bitrate and provide streaming video instead of sending images.
    d. Flow—FIG. 3 depicts a flow diagram of an example implementation of the method of the instant system.

While the steps detailed hereafter are described sequentially, some of the steps may be performed out of order or simultaneously to other steps. Furthermore, various steps may be omitted for the purpose of conciseness and flow of explanation. Those skilled in the art would be aware of the necessary steps, even if not explicitly mentioned herein. Accordingly, the foregoing is not intending to limit the process to these steps and only these steps or to the sequence in which they are presented. Further, in some implementations, one or more of the foregoing steps may be omitted where relevant. The aforementioned applies equally to other processes detailed herein.

i. At step 302, the End User browser opens a connection to the Remote Browser, also referred to herein as "Ericom Shield".

ii. At step 304, the Remote Browser renders the web pages and at step 306 the Remote Browser shares its virtual screen with the end user browser seamlessly. In some embodiments, the Remote Browser sends image files (e.g., .jpeg files). In other embodiments, as depicted in the Figure, the Remote Browser uses WebRTC (or similar program) to stream the screen back to the Local Browser.

iv. At step 308 the End User browser displays the remote screen.

v. When a user clicks or performs any action, that action, at step 310, is mirrored and performed on the Remote Browser.

vi. No JavaScript code is sent to the end user browser.

2. End User Support via RBI

When a user browses via the RBI, the user has the ability to request Remote Support from the Enterprise Helpdesk. In the Remote Browser, a new option in the context menu is "Request Remote Support". When the End User chooses this option, a Video Conference Session is initiated, and a Support representative is invited to the session. The End User will be able to share his desktop and the support representative will be able to provide the support required.

3. Improve Resource Usage Based on User Face Behavior Detection

To improve resource usage efficiency, the RBI system can capture the user webcam video stream (for example by leveraging webRTC technology), and apply machine learning algorithms (e.g., TensorFlow) to the video stream. This will allow to detect the user's face and his facial expressions and associated body language (such as in https://webrtchacks.com/stop-touching-your-face-with-browser-tensorflow-js/).

In this aspect, the system can adjust the quality of the user's web service based on the facial/body language detection. For example, the system may improve the quality of the page the user is viewing if the user is looking at the page and reduce the quality of the page if the user looks away.

4. Face Recognition to websites as an authentication method a. Per configuration, the admin can define for each site/user/group a requirement to pass a facial recognition test before the user can connect to specific sites.

b. End Users can setup their Face-ID using an internal Website.

c. When an End User attempts to connect to a site that requires face recognition, the User's webcam is used to capture images of the user's face in order to recognize the User lace-ID, for example using webRTC. The captured images (at least one of which includes facial image) are sent to a machine learning/AI engine that detects the face of the user from the images and compares the detected face to the User Face as pre-configured.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for remote browsing, comprising:
running a local browser instance on a local device;
running a remote browser to interface between a third party and said local browser, wherein said third party is a web conferencing (WC) service and wherein the remote browser has no controlling access over resources on the local device except for capturing keystrokes and mouse or other cursor movements;
sending an image of the remote browser to the local browser and presenting an image of said local browser to said third party;
selecting, on said remote browser, a local resource from a virtual representation of said local resource on said remote browser, said virtual representation being generated on the remote browser from meta data provided by the local device, relating to said local resources to which the remote browser has no access; and
redirecting data from said selected local resource from said local browser to said remote browser.

2. The method of claim 1, wherein said data is redirected from said local browser to said remote browser via direct peer-to-peer communication from within a browser.

3. The method of claim 2, wherein said direct peer-to-peer communication is facilitated by Web Real-Time Communication (WebRTC).

4. The method of claim 1, further comprising:
generating a menu of local resources, on said remote browser, from which said virtual representation of said local resource is selected.

5. The method of claim 4, further comprising
scanning an end-user device running said local browser to ascertain available local resources to populate said menu of local resources; wherein said scanning is performed continuously or on demand.

6. The method of claim 1, wherein a predetermined period after the local browser disconnects from the remote browser said remote browser is configured to terminate.

7. The method of claim 1, wherein said local resource is selected from the group including: a microphone, a webcam, a screen.

8. The method of claim 1, wherein said step of sending said image of the remote browser to the local browser is performed using WebRTC.

9. The method of claim 1, wherein said third party is a Remote Support service.

10. The method of claim 1, wherein the local browser connects to the remote browser via a proxy.

11. The method of claim 10, wherein the local browser downloads an agent from said proxy to enable communication with said remote browser.

12. The method of claim 10, wherein said data from said local resources is also redirected to said proxy.

13. The method of claim 12, wherein said data is manipulated by said agent and remote browser.

* * * * *